UNITED STATES PATENT OFFICE.

WILLIAM G. ROACH AND ALBERT C. ROACH, OF CINCINNATI, OHIO, ASSIGNORS OF THREE-FIFTHS TO HENRY C. YEISER AND OTTO H. L. WERNICKE, OF CINCINNATI, OHIO.

ARTIFICIAL STONE.

SPECIFICATION forming part of Letters Patent No. 720,739, dated February 17, 1903.

Application filed February 6, 1902. Serial No. 92,907. (No specimens.)

*To all whom it may concern:*

Be it known that we, WILLIAM G. ROACH and ALBERT C. ROACH, citizens of the United States, residing at Cincinnati, in the county of Hamilton and State of Ohio, have invented certain new and useful Improvements in Artificial Stone and the Process of its Manufacture, of which the following is a full, clear, and exact description.

It is the purpose of our invention to produce an artificial stone for building material, paving purposes, and the like which shall resemble in appearance and possess in a marked degree the desirable qualities for such purposes of the igneous rocks of the crystalline aggregate type.

Heretofore in the manufacture of artificial building and paving material by the process of fusion the resulting structure, however obtained, has either been amorphous or vitreous in its composition, while it is the purpose of our invention to obtain a crystalline structure which shall add to the strength and lasting qualities of the composition. The result is obtained both by the proportions of the ingredients employed, so as to establish a new composition of matter, and by our method of treatment, involving our new process of manufacture.

The materials of our composition and our method of treatment are as follows: Clay and sand are mixed in the proportions, substantially, by weight, of one-third sand to two-thirds clay with half the quantity, by weight, of lime, to which is added a sufficient quantity—say about ten per cent.—of fluor-spar and salt, in about equal proportions, to form a proper flux for the mass. The proportions of the ingredients can be varied according to their nature; but those given produce very good results when treated as hereinafter described. As the nature and proportions of the ingredients vary, so the results may be varied from low to high grade, or vice versa, according to commercial requirements. The ingredients when properly mixed are melted in a suitable furnace at a fusing temperature, usually ranging from 2,800° to 3,600° Fahrenheit or in any other way, and for the purpose of allowing the liquid mass to become clarified of gas and homogeneous throughout it is then maintained at furnace heat from a few minutes to half an hour. Thence the liquid is run into heated molds of the form of block desired. It is essential, however, that the molds be heated sufficiently before use not to chill the molten material or allow it to cool too rapidly before it sets, which it does in a few minutes. The blocks at a red heat are not plastic, as a glass composition would become under similar treatment, but firm and rigid, like cast metal. As soon as the liquid mass is in the molds they are run into an annealing-furnace or otherwise allowed to cool slowly to a black heat for the molds, or, say, about 400° Fahrenheit. This temperature is reached within an hour, and the blocks may then be removed and embedded in hot sand or stacked in leers and allowed to cool slowly to atmospheric temperature, say, for ten or twelve hours.

The resulting blocks of artificial stone will be found to be homogeneous throughout, hard, tenacious, and of a crystalline aggregate structure differing very materially from the glassy or devitrified compositions or the amorphous or granular structures the product of the processes or ingredients of the prior art.

We are well aware that it has been proposed heretofore to fuse in regenerative or other furnaces mixtures in varying proportions of clay, sand, and lime with various ingredients for a necessary flux and then to cast the fused mass into molds of various shapes; but heretofore no attention has been paid to the particular proportions of ingredients employed by us nor to the use of molds heated to prevent vitrification of the mass when cast. If too much sand or too little lime is used or a proper control of heat is not provided for and observed in the annealing, a glassy composition is the result instead of our crystalline aggregate structure. We are also aware that it has long been customary to devitrify glass by heating same surrounded by sand and gypsum to a point short of fusion or by melting an impure glassy structure and then allowing it to cool slowly by permitting the furnace to die out; but devitrified glass does not possess the characteristics of our composition. Devitrified glass is amorphous, brittle, and breaks with a conchoidal fracture. We are further aware that artificial stone compositions have been obtained by fusing clays, then mixing same with sand, powdered granite, or other refractory material and then refusing the mass sufficiently to form a bond for the refractory material; but such compositions are usually amorphous or granular in structure and do not comply with the essential features of our composition, or if crystallization takes place it is only after intense firing for a long period.

Various kinds of clay may be employed for the composition by varying the proportions of the other ingredients according to the nature of the clay, and the effect of the calcium oxid in the compound may be obtained by using limestone rock or calcium carbonate in other forms, the carbonate being converted into oxid before fusion.

Having thus described our invention, what we claim, and desire to secure by Letters Patent, is—

1. The process of manufacturing artificial stone block, which consists in fusing clay, sand and lime in substantially the proportions specified, casting same in heated molds, then annealing to produce a crystalline aggregate structure, substantially as described.

2. The process of manufacturing artificial stone block, which consists in fusing clay, sand and lime with a suitable flux in substantially the proportions specified, casting same in heated molds, then slowly annealing, as specified, to produce a crystalline aggregate structure substantially as described.

3. The process of manufacturing artificial stone block, which consists in fusing clay, sand and lime, with a suitable flux, in substantially the proportions specified, maintaining same in a liquid state to settle, then casting same in heated molds and slowly annealing, as specified, to produce a crystalline aggregate structure, substantially as described.

4. The process of manufacturing artificial stone block, which consists in fusing clay, sand, lime, salt and fluor-spar, in substantially the proportions specified, casting same in heated molds, then annealing as specified to produce a crystalline aggregate structure, substantially as described.

5. An artificial stone, of a crystalline aggregate structure, derived from the fusion of clay, sand and lime in substantially the proportions by weight of one-half sand for the clay and one-half lime for the mixture of clay and sand as specified.

6. An artificial stone, of a crystalline aggregate structure, derived from the fusion of clay, sand, lime, salt and fluor-spar, in substantially the proportions specified.

WILLIAM G. ROACH.
ALBERT C. ROACH.

Witnesses:
W. S. KYLE,
CHARLES W. HOFFMAN.